Sept. 13, 1966  J. W. HOLMES  3,272,977
LIGHT SOURCES
Filed April 17, 1964  3 Sheets-Sheet 1
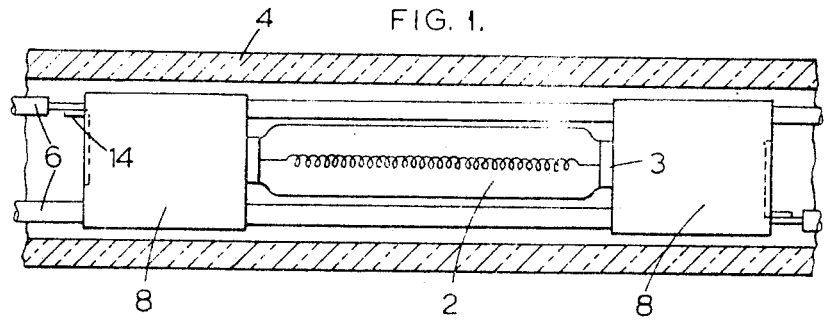
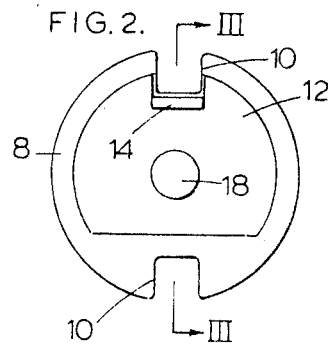
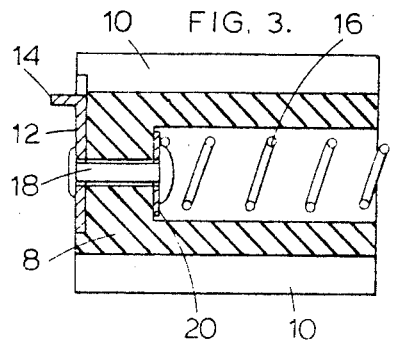
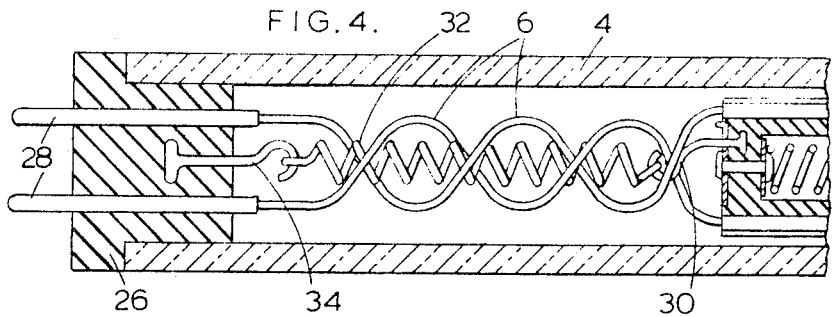
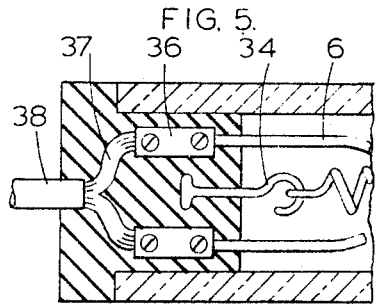
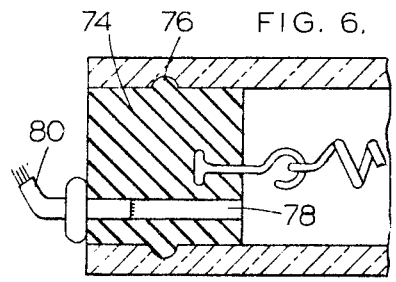
INVENTOR
JOHN WEST HOLMES
By Shoemaker and Mattare
Attys.

Sept. 13, 1966  J. W. HOLMES  3,272,977
LIGHT SOURCES

Filed April 17, 1964  3 Sheets-Sheet 2

INVENTOR
JOHN WEST HOLMES
By Shoemaker and Mattare
ATTYS.

Sept. 13, 1966 J. W. HOLMES 3,272,977
LIGHT SOURCES

Filed April 17, 1964 3 Sheets-Sheet 3

INVENTOR
JOHN WEST HOLMES
By Shoemaker and Mattare
ATTYS.

United States Patent Office 3,272,977
Patented Sept. 13, 1966

3,272,977
LIGHT SOURCES
John W. Holmes, 45 Bodmin Road,
St. Austell, Cornwall, England
Filed Apr. 17, 1964, Ser. No. 360,637
12 Claims. (Cl. 240—11.2)

The present invention relates to light sources and particularly to elongated flexible light sources for outdoor use which can be either free standing, embedded in precast structures, or inserted in pre-formed grooves in support bodies.

The present invention aims at providing an elongated light source suitable for indicating the edges of a path or road or a desired direction, such as for lane-lines on airfields.

One aim of the present invention is to achieve a form suitable for miniaturisation, which yet retains robustness and cheapness.

Accordingly the present invention provides a light source including a hollow waterproof tube of flexible transparent or translucent material housing a series of lamps spaced apart and slidable along the length of the tube, electrically connected together by conductors and mechanically connected together by at least one tension member, which may be a conductor, in which the conductors extend inwardly from part of an electrical coupling positioned at one or each end of the tube, and in which means are provided to keep the tension member in tension.

The present invention is able to be used with filament lamps which may be supplied with direct or alternating current, or with discharge lamps supplied with alternating current. It is intended that the light source be in the form of a tube of standard length with the lamps therein spaced apart at intervals which depend on the total light output desired and the intensity of each lamp. For a length of 80 feet of tube containing lamps designed to be supplied with direct current at 12 volts the filament lamps are spaced apart at intervals of 2 feet and each lamp may be rated at 3 or 6 watts. For a source to be energised at 24 volts D.C. the length may be 170 feet while the spacings of the lamps are the same. For discharge lamps designed to be energised with electricity at 240 volts and 50 c./s. each source has a length of 60 feet and houses in it 6 discharge lamps at 10 foot centres. In the case of discharge lamps it is necessary for them to be connected to ballasts which are preferably housed in the same tube or extension thereof as are the lamps.

Examples of the present invention are illustrated in the accompanying drawings, in which:

FIG. 1 is a side elevation, part in section, of a filament lamp connected to two conductors extending along the length of a tube;

FIG. 2 is an end elevation of one of the lamp carriers shown in FIG. 1, with the conductors removed;

FIG. 3 is a section of the lamp carrier shown in FIG. 2 along the line III—III;

FIG. 4 is a side elevation, part in section, of an end fitting of the light source shown in FIG. 1 showing how tension is applied to the conductors via the first lamp housing by means of a tension spring;

FIGS. 5 and 6 are side elevations, part in section, of end parts of fittings alternative to those shown in FIGS. 4 and 7;

Figure 7:
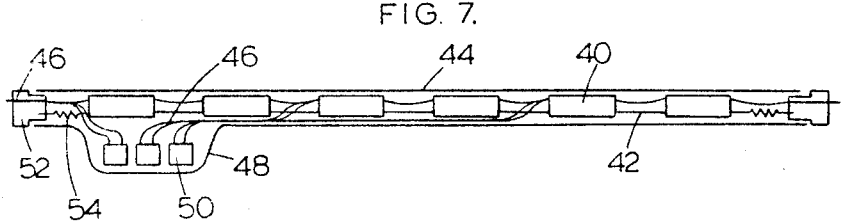
FIG. 7 is a purely diagrammatic view of a second form of light source including a series of discharge lamps housed in a tube and an extension to accommodate control units, not to scale.

In the embodiment shown in FIGS. 1 to 4 of the drawings a series of tungsten filament double-ended lamps 2 are housed in a tube 4 of suitable flexible transparent or translucent plastics material. Extending longitudinally of the tube is a pair of conductors 6. Associated with each lamp 2 is a pair of lamp carriers 8 of which each has one of the conductors secured to it. As shown clearly in FIG. 2, each carrier 8 has its outer surface formed with a pair of diametrically-opposed longitudinally extending grooves 10 in each of which one of the conductors 6 is housed. Each conductor 6 is insulated and has the insulating sheath stripped off the conductor at intervals apart which correspond to the desired spacing apart of the lamps 2 along the length of the tube. Mounted on each end face of the lamp carrier 8 is a metal plate 12 which has bent out from its periphery a soldering lug 14 which, as shown clearly in FIG. 3, is contiguous with the bottom of the adjacent groove 10 and to which the adjacent bared portion of the conductor 6 can be soldered.

The plate 12 is electrically connected to a compression spring 16 housed within the lamp carrier by means of a rivet 18 having its head clamping a metal plate 20 at the inner end of the cylindrical opening in the lamp carrier.

Figure 11:
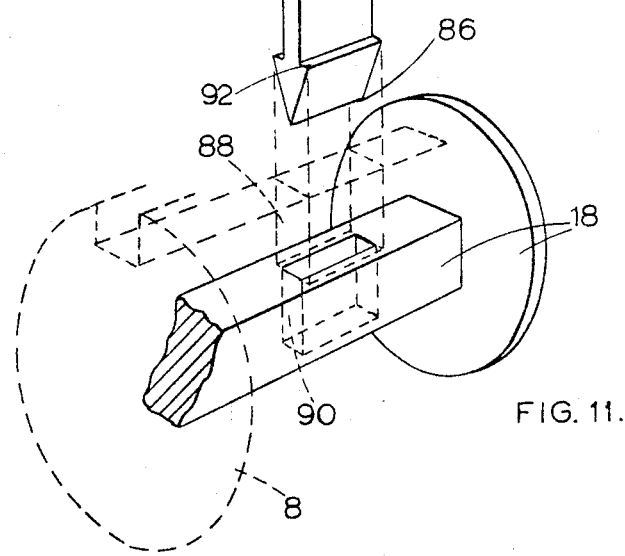
FIG. 11 is a pictorial representation of a form of electrical connection alternative to that shown in FIG. 3, showing an arrangement of some of the parts before assembly.

In an alternative embodiment electrical connection can be made to the respective conductor 6 by means of a pin as shown at 82 in FIG. 11, sharpened at edges 84, 86, designed to pierce the insulation of the conductor, to pass through the strands of the conductor and through an aligned hole at 88 formed in the end of the lamp carrier and to pierce the rivet 18 at 90. The pin is designed to be locked in contact with the rivet by barbs 92 and with the strands of the conductor to establish a strong mechanical and electrical contact without the use of solder.

The conductors 6 are designed to interconnect the lamps mechanically, as well as electrically. For this purpose they are placed under tension. One means of doing this is to secure both conductors rigidly to a first plug at one end of the tube 4 and to secure them through a tension spring to a second plug 26, as shown in FIG. 4, at the other end of the tube. In the form of tensioning device shown in FIG. 4, each conductor 6 is electrically connected to a pin 28 which extends through said second plug 26, the pins 28 projecting from the outer face of the plug to enable electrical contact to be made to the conductors 6 by part of a conventional electrical coupling. Internally of the plug 26 the conductors 6 extend without tension to the lamp carrier nearest to plug 26 to which carrier there is secured by a hook 30 embedded in the said carrier one end of a tension spring 32 the other end of which is secured by a hook 34 embedded in the material of the plug 26. Between the said carrier and the plug 26 the conductors are not under tension and sufficient length of conductor is left between the said carrier and plug so that the plug may be removed from the end of the tube 4 against the increase in tension of the spring 32, without its being necessary to disconnect the conductors 6 from the pins 28.

In the alternative embodiment which is shown in FIG. 5 of the tensioning device shown in FIG. 4, the pins 28 are replaced by brass connectors 36 and the leads 37 from an electricity supply cable 38 are screwed thereto.

In yet another alternative embodiment which is shown in FIG. 6 of the tensioning device shown in FIG. 4 or that indicated in FIG. 7 the supply cable enters a hole 78 in the plug 74 through a bush or sleeve 80 which makes a watertight seal therebetween, and resilient means 76 makes a watertight seal between plug 74 and the tube.

The dimensions of the lamp carrier 8 are less than the internal dimensions of the tube 4 so that the lamps can be drawn consecutively into the interior of the tube by means of tension applied to the conductors 6. When in the assembled position movement of the lamps and lamp carriers relatively to the tube, when the tube is flexed, is permitted, the positioning of each lamp being determined by the tension in the conductors 6 on both sides of the lamp.

Each lamp 2 is of the double-ended type and the cap 3 of each lamp is a relatively loose fit in the interior of the lamp carrier 8 so that the lamp 2 is able to pivot to a limited extent about its connection with the compression spring 16 as the tube is flexed, without the electrical connection being broken. By this means turns of extremely small radius of curvature, for example of the order of 8 inches, can be achieved.

In the embodiment of the invention shown in FIGS. 7, 8, 9 and 10 each lamp is housed in a rigid fitting 40. The fittings are interconnected mechanically by means of a tension wire 42 extending the length of the tube 44. Extending between each fitting 40 is a conductor harness 46 not under tension. This harness may be connected electrically by plug means to each fitting 40. The conductors in the harness 46 are of light gauge since the lamps in the fittings are energised at 240 volts A.C.

Seated in a lateral extension 48 of the tube 44 are one or more ballast devices 50 each electrically connected to the lamp(s) it controls in the tube 44. The extension 48 may be non-integral with the wall of the tube 44. It may comprise two plastics mating sections 49, FIG. 8, to house the ballast devices 50, and there may be mechanically secured to the extension an end 45 of a preceding tube similar to 44. There may be included a water-tight ring to seal the mating surfaces.

One or each end of the tube 44 is closed by a plug 52. The plug or each of the plugs has one end of a spring 54 secured to it, the spring or springs between them acting to keep the tension wire 42 under tension. Also projecting through at least one plug 52 is the harness 46 in a waterproof rubber bush or sleeve 80, FIG. 6, whereby a series of lengths of tube, each housing six lamps, can be connected together.

Figure 9:
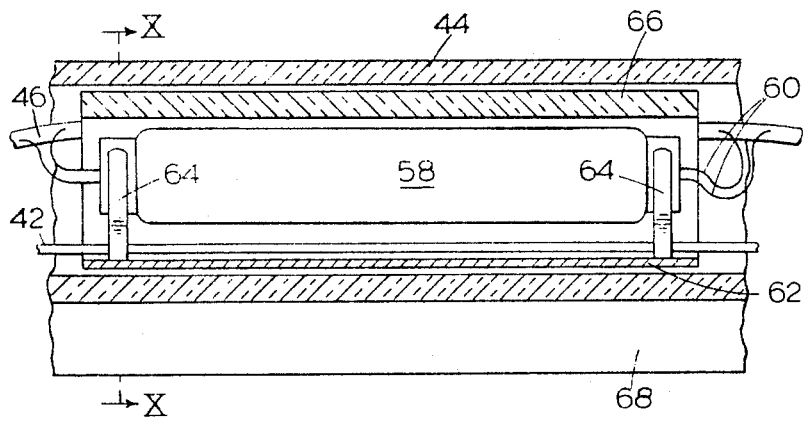
FIG. 9 is a side elevation, part in section, of a lamp and lamp fitting as shown in FIG. 7, to a generally larger scale than that of FIG. 7.

As shown in FIG. 9 each lamp 58 is of the discharge type with a pair of pin conductors 60 to its heating electrodes projecting from each end. Flexible conductors extend from the pins 60 to the conductor harness 46 for connecting each lamp both to a source of electrical voltage and to the respective ballast 50. The lamp 58 extends along the length of a metal trough 62, being secured thereto at each end by means of a spring clip 64 earthed and anchored mechanically at its base to the trough 62 and to the tension wire 42.

Figure 10:
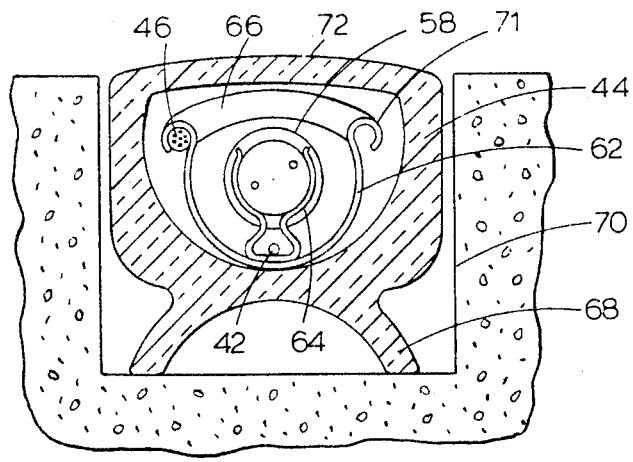
FIG. 10 is an end elevation, part in section along the line X—X, of the light source shown in FIGS. 7 and 9 in position in a channel formed in concrete.
Figure 8:
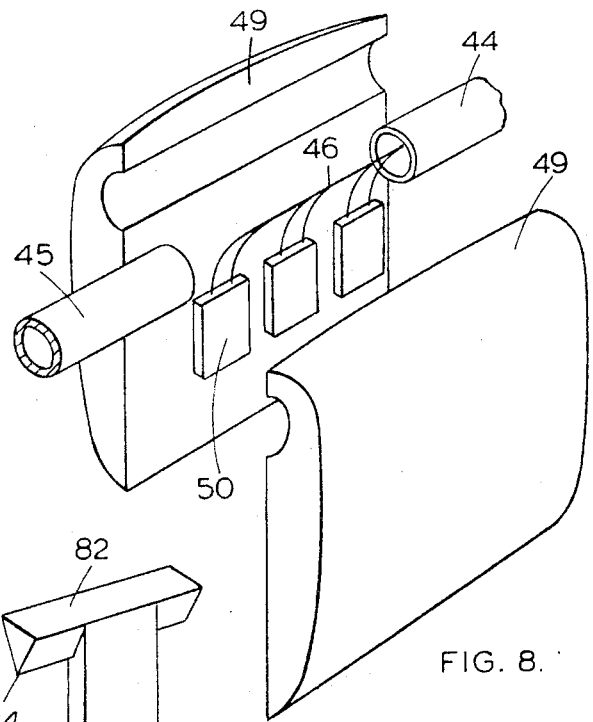
FIG. 8 is an exploded view of one form of the extension indicated in FIG. 7.

The cross sectional shape of the longitudinally-extending edges of the trough 62 forms a loop 71, as best shown in FIG. 10, through at least one of which the harness 46 extends.

Seated on and clipped by pressure fit into the rounded longitudinally-extending surfaces presented by the walls of the trough is a bridge member 66 of transparent or translucent plastics material. The longitudinally-extending edge surfaces of the bridge 66 are shaped so as to be complementary to the curvature of the adjacent surfaces of the trough 62 so that the bridge is firmly seated on the trough.

The trough and bridge 66 combine to form the fitting 40 shown in FIG. 7 of the drawings.

In the form of the invention shown in FIG. 10, the tube 44 in which the lamps are housed is provided with a pair of longitudinally-extending ribs 68 by means of which the light source is free-standing. This form of light source is designed to be seated in a rectangular-sectioned channel 70 so that the upper surface 72 of the tube 44 are translucent or transparent so that light emitted by the lamp 58 delineates of the channel 70. Should an external weight be applied to the surface 72, such as by the wheel of an aircraft or other vehicle, the horizontal wall of the tube 44 is deflected downwardly until it comes into contact with the bridge 66 which is sufficiently strong to transmit the force applied to it to the walls of the trough 62 which in turn apply a load to the base of the tube 44, to cause flexion of the legs defined by the ribs 68. The tube 44 and the ribs 68 are able to flex sufficiently until the light source is so far below the upper surface of the channel 70 that the walls of the channel support the major weight of the wheel thereby limiting the vertical load applied to the light source. The light source is designed so that all the members thereof are able to absorb such a vertical load without the load being applied to the lamp 58 or its electrical contacts.

In both forms of the invention described above one or more flashing units (not shown) may be included. Such units may be incorporated in at least one and preferably in each length of tube so that intermittent light is given out from part or all of each light source.

In both forms of the invention described above one or more photoelectric means may be included. Such means may be incorporated in at least one and preferably in each length of tube so that at least part of the or each light source may be switched on or off by external light control, for example a decrease in daylight may switch on each light source.

Either of the above embodiments of the invention may have a reflector positioned in the tube to emit light from the tube over a limited angular extent. The reflecting surface may be provided by a separate reflector in the tube or the tube itself may be provided with a metallised reflecting layer.

When the light source is intended to be slung between two supports for aerial use the tube may include a messenger strand incorporated in it during the extrusion process by which the tube is preferably formed. Alternatively the tube may be enclosed in an open weave tube of suitable light-transmitting material such as nylon.

The cross-sectional shape of the tube may be non-circular and may have two or more re-entrant angles so that the tube may be keyed in a support member which is cast at least partly around it.

I claim:

1. A light source comprising a hollow waterproof tube of flexible transparent plastic material housing a series of lamps spaced apart and slidable within and along the length of the tube, the said lamps being electrically connected together with each other by conductors and mechanically connected together by at least one tension member, the said conductors extending inwardly from part of an electrical coupling positioned at each end of the tube, the light source further comprising means for keeping the tension member in tension in the form of an anchorage for the tension member at one end of the tube and a tension spring connected to the tension member at the other end of the tube, and in which light source a pair of insulated conductors extend along the length of the tube and act also as tension members, each lamp extending between a pair of lamp carriers and each conductor being electrically associated with and mechanically connected to one carrier of each pair.

2. A light source comprising a hollow waterproof tube of flexible transparent plastic material housing a series of lamps spaced apart and slidable within and along the length of the tube, the said lamps being electrically connected together by conductors extending inwardly from part of an electrical coupling positioned at each end of the tube and mechanically connected together by at least one tension member, means for keeping the tension member in tension, the said means for keeping the tension member in tension being in the form of an anchorage to which the tension member is connected at one end of the tube and a tension spring connected to the tension member at the other end of the tube, the said conductors being a pair of insulated conductors which extend along the length of the tube and act also as tension members, each lamp extending between a pair of lamp carriers and each conductor being electrically associated with and mechanically connected to one carrier of each pair, each pair of carriers including spring contacts which together exert an axial load on the lamp, and the reaction force exerted on the carriers being taken up by the conductors extending between them.

3. A light source comprising a hollow waterproof tube of flexible transparent plastic material housing a series of lamps spaced apart and slidable within and along the length of the tube, the said lamps being electrically connected together by conductors and mechanically connected together by at least one tension member, means for keeping the tension member in tension, each said lamp being a discharge lamp, a rigid fitting in which each said discharge lamp is seated, the said fittings being mechanically connected together by a tension wire extending between them and the lamp terminals of each lamp being connected to insulated conductors separate from the tension wire.

4. A light source as claimed in claim 2, in which each carrier includes a body of insulation material housing a compression spring electrically connected to a conductor running in a groove in the outer surface of the carrier.

5. A light source as claimed in claim 4, in which each spring is electrically connected to a metal plate on the outer end face of the carrier, from which plate projects a lug adjacent to and in line with the groove, to which lug the respective conductor is soldered.

6. A light source as claimed in claim 3, in which each end of the lamp is gripped by a spring seated in a trough of rigid material, the trough and spring co-operating to define longitudinally-extending pockets through which the conductors extend.

7. A light source as claimed in claim 3, in which the fitting surrounds the curved surfaces of the lamp, at least part of the fitting being transparent.

8. A light source as claimed in claim 3, in which each lamp is connected to a ballast device spatially separated from the lamp and housed in a chamber in communication with the tube.

9. A light source as claimed in claim 2, in which the cross-sectional shape of the exterior of the tube is circular.

10. A light source as claimed in claim 2, in which the cross-sectional shape of the exterior of the tube is non-circular.

11. A light source as claimed in claim 10, in which the tube has a pair of externally projecting longitudinally-extending ribs on which the tube can stand, the surface of the tube between the ribs being spaced from a plane tangential to both ribs.

12. A light source as claimed in claim 2, in which at least a portion of the length of the tube is coloured.

References Cited by the Examiner

UNITED STATES PATENTS

| | | | |
|---|---|---|---|
| 1,839,479 | 1/1932 | Hartman | 240—11.2 |
| 2,137,732 | 11/1938 | Swanson | 240—11.2 X |
| 2,162,302 | 6/1939 | Greene | 240—1.2 X |
| 2,874,270 | 2/1959 | Douglass et al. | 240—11.4 |
| 3,115,309 | 12/1963 | Spencer et al. | 240—103 X |

FOREIGN PATENTS 1,343,509  10/1963  France.

NORTON ANSHER, *Primary Examiner.*

C. R. RHODES, *Assistant Examiner.*